United States Patent

[11] 3,568,110

[72] Inventor Ferdo Ivanek
Palo Alto, Calif.
[21] Appl. No. 833,264
[22] Filed June 16, 1969
[45] Patented Mar. 2, 1971
[73] Assignee Fairchild Camera and Instrument Corporation
Syosset, Long Island, N.Y.

[54] MODULAR POWER COMBINING TECHNIQUES USING SOLID STATE DEVICES FOR DC-TO-RF ENERGY CONVERSION
11 Claims, 15 Drawing Figs.

[52] U.S. Cl. .......... 333/83, 330/10, 330/34, 330/53, 331/96
[51] Int. Cl. .......... H01p 7/06, H03f 3/00
[50] Field of Search .......... 333/83; 330/10, 34, 53; 331/107, 96, 52—54, 101, 56; 329/161

[56] References Cited
UNITED STATES PATENTS

| | | | |
|---|---|---|---|
| 3,076,149 | 1/1963 | Knechtli et al. | 330/56X |
| 3,356,866 | 12/1967 | Misawa | 307/318 |
| 2,637,813 | 5/1953 | Braden | 329/161 |

OTHER REFERENCES

TUNNEL DIODE AMPLIFIERS in Electronics, March 4, 1960 pages 41—42

RESONANT-CIRCUIT OPERATION OF GUNN DIODES: A SELF-PUMPED PARAMETRIC OSCILLATOR-Carrol in ELECTRONICS LETTERS June 1968 Vol.2 No. 6 pages 215—216

*Primary Examiner*—Herman Karl Saalbach
*Assistant Examiner*—Marvin Nussbaum
*Attorneys*—Roger S. Borovoy and Alan H. MacPherson

ABSTRACT: Microwave power sources capable of operating over different frequency ranges and each containing a plurality of active solid state devices for direct conversion of DC energy to RF energy, are constructed by tandemly-connecting power source modules selected from a limited number of module types. Each module, which is merely bolted to adjacent modules, possesses a microwave cavity containing a single symmetrically or asymmetrically mounted active solid state device.

INVENTOR.
FERDO IVANEK
BY Alan H. MacPherson
ATTORNEYS

INVENTOR.
FERDO IVANEK
BY Alan H. MacPherson
ATTORNEYS

MODULAR POWER COMBINING TECHNIQUES USING SOLID STATE DEVICES FOR DC-TO-RF ENERGY CONVERSION

BACKGROUND OF THE INVENTION

1. Field of the Invention

This invention relates to microwave power sources and in particular to modular structures for use in constructing microwave oscillators and amplifiers, each module containing an active solid state device for direct DC to RF energy conversion. Such modules allow microwave devices with differing operating characteristics to be constructed by combining, in different ways, microwave power sources selected from a limited number of module types.

2. Prior Art

The use of active solid state devices, such as Gunn or avalanche diodes, as power sources for direct conversion of DC power to RF power at microwave frequencies is well known. Typically, many applications require more power than can be obtained from a single device. Thus often several active solid state devices are used in one microwave power source. Such a structure is disclosed for example, in an article by Boronski entitled "Parallel Fed C. W. Gunn Oscillators Cascaded in X-band Waveguide for Higher Microwave Power," published in Volume 4, No. 10 of Electronics Letters, May 17, 1968, on pages 185 and 186. And, C. B. Swan et al. in an article entitled "Composite Avalanche Diode Structures for Increased Power Capability," IEEE Transactions on Electron Devices, Sept. 1967, discloses connecting in parallel several IMPATT diodes, all mounted in the same package.

A problem with microwave oscillators is that the solid state devices used to generate microwave oscillations have a conversion efficiency usually in the 1 to 10 percent range. While the power output of microwave oscillators is increased by using more than one solid state device to place energy into the microwave oscillator, the amount of heat generated by the oscillator is directly proportional to the number of solid state devices used. Thus, an increase in the useful power of a microwave oscillator is accompanied by a proportional increase in the amount of heat produced. To remove this heat, forced air cooling is sometimes used. This, however, is not completely satisfactory because if the cooling system fails, the devices fail. Liquid nitrogen cooling has also been proposed. But this is expensive, as bulky equipment is required to prepare and handle the liquid nitrogen. The ideal solution is to allow natural convection and conduction to cool the devices.

Various power combining arrangements have been proposed which inherently reduce the heat removal problem. For example, Fukui, in the Oct. 1966 Proceedings of the IEEE on pages 1475—1477, discloses a hybrid circuit combining power from eight spaced-apart silicon avalanche diode oscillators. However, as discussed by Magalhaes and Schlosser, in a paper given at the 1968 International Solid State Circuits Conference in Philadelphia, on Feb. 16, 1968, Fukui's hybrid circuit becomes complicated when the number of oscillators to be combined increases. Magalhaes and Schlosser then disclose series-connecting IMPATT diodes to provide a source of higher power microwave oscillations. Unfortunately, because of the particular mounting of the diodes, Magalhaes and Schlosser's structure impedes removal of the heat generated by the diodes even though each series-connected diode is separated from the adjacent diodes by a portion of a wavelength. Furthermore, the bias voltage applied to the diodes must be larger, by the number of diodes, than the bias voltage applied to each diode. Such large bias voltages are undesirable.

Another problem with prior art oscillators is that a wide variety of solid state device housings must be available to produce oscillators operating at different frequencies. Because the active solid state devices in microwave oscillators are typically spaced by one-half the waveguide wavelength $\lambda_g$, reflecting the fact that impedance values along a waveguide repeat periodically along the waveguide at nominal distances of one-half the waveguide wavelength, different frequency oscillators require different device spacings.

Thus, Boronski, in his above-cited article, spaces four Gunn diodes along a microwave waveguide such that the diodes oscillate at a frequency of about 9 GHz. To operate at other frequencies, the spacing of the diodes within the waveguide would have to be changed. This requires redesign and retooling. The manufacture of microwave devices operating at different frequencies is thus an expensive proposition.

SUMMARY OF THE INVENTION

This invention, on the other hand, overcomes the above-described disadvantages of the prior art solid state microwave oscillators. By use of several standard solid state device modules, this invention makes it possible to construct an oscillator capable of operating over several different microwave frequency ranges merely by selecting from certain basic components. No expensive retooling or redesign is required to obtain different oscillation frequency ranges. Rather, merely by changing either the orientation of selected device modules, or the modules themselves, oscillators with different operating frequency ranges are easily and accurately constructed. Moreover, because the solid state devices are selectively spaced along the waveguide, natural convection and radiation cools the oscillator. The oscillator's output power is approximately the sum of the output powers of the individual solid state devices.

According to this invention, active solid state devices capable of converting DC to RF energy in microwave frequency ranges are both symmetrically and asymmetrically placed in housings or "modules" such that the distance between two power sources in adjacent modules depends upon either the particular modules joined or upon the relative orientation of the modules. Thus, no longer is it necessary to vary the spacing between active solid state devices in a single waveguide to obtain different oscillation frequencies. Instead, using the principles of this invention, with only a limited number of standard power source module types, microwave oscillators can be constructed operating over a wide variety of different frequency ranges. For example, with two power source module types, one containing a symmetrically mounted solid state device, and the other containing an asymmetrically mounted solid state device, six different two-module microwave power sources can be constructed, each power source operating optimally over a different frequency range. As the number of devices per microwave power source increases, in general the number of different optimal microwave power sources obtainable from a limited number of module types, decreases. Because spacers are not required between adjacent modules (although spacers can be used if desired) the number of junctions in the microwave structure is reduced to one-half the number which would be present if waveguide spacers of different widths were used to obtain different oscillating frequencies. Thus, the possibility of poor mechanical alignment of the junctions and poor electrical contact between junctions is significantly reduced, thereby reducing the waveguide machining and assembly costs.

While this invention will be described in terms of microwave oscillators, the module concept of this invention can likewise be applied to microwave amplifiers.

This invention will be more fully understood in light of the following detailed description taken together with the accompanying drawings.

DETAILED DESCRIPTION

Currently, sources of microwave energy are available covering, for example, the frequency ranges from 10.7 to 11.2 GHz, 11.2 to 11.7 GHz, 11.7 to 12.2 GHz and 12.2 to 12.7 GHz, all in the X-band frequency range. To increase the power of a microwave oscillator operating in any one of these frequency bands, the number of active solid state devices used in the microwave power source can be increased. The spacing between the devices serves not only to control the optimum frequency of oscillation of the tandemly-connected power sources, but also to prevent excessive heat buildup within a small region of the microwave oscillator by making it possible for natural convection and radiation to cool the microwave power source. While the prior art would require four different waveguides, each with a spacing of the active solid state devices contained therein compatible with one of the four different optimum operating frequency ranges, this invention makes it possible to obtain a given number of different oscillator frequency ranges by selectively combining microwave device modules selected from a smaller number of module types. Each module contains an active solid state device either symmetrically or asymmetrically mounted in the module.

Figure 1A:
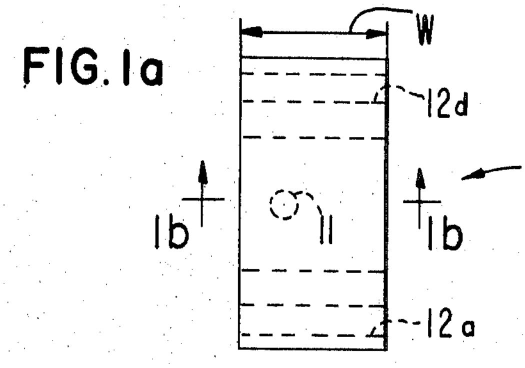
FIGS. 1*a*, 1*b*, and 1*c* show schematically a typical microwave waveguide module containing an asymmetrically mounted active solid state device.
Figure 1B:
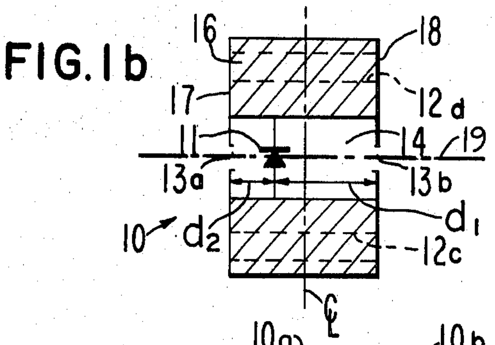
Figure 1C:
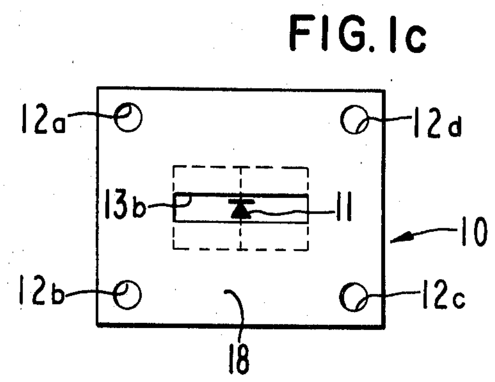

FIGS. 1*a* through 1*c* illustrate one microwave module 10 of this invention. In module 10, the solid state device 11, typically a diode such as a Gunn, tunnel, or avalanche diode, is mounted within cavity 14 of housing 16. Housing 16 contains four bolt holes 12*a*—12*d* for use in aligning module 10 with, and attaching module 10 to, one or more corresponding modules. An assembly of a series of mounts 10 comprises a microwave power source capable of oscillating at a frequency determined by the spacing between the solid state devices. At optimum frequency of oscillation, its output power equals approximately the sum of the output powers produced by the individual power sources.

Device 11 is asymmetrically mounted within housing 16. Thus, device 11 is placed a distance $d_2$ from face 17 of housing 16 and a distance $d_1$ from face 18 of housing 16. Faces 17 and 18 are mutually parallel and perpendicular to the longitudinal axis 19 of cavity 14. As will be seen later, this invention also includes modules where the device is symmetrically mounted within the module.

Irises 13*a* and 13*b* are shown in faces 17 and 18, respectively, of housing 16. Typically, irises 13*a* 13*b* are much wider than they are high, as shown, visually exposing only solid state device 11 when viewed from an adjacent module. However, irises 13, while providing low impedance cavity terminations, are not absolutely essential. Rather, cavity 14 could, if desired, terminate at each face of module 10 in openings the size of cavity 14's cross-sectional area.

Figure 2A:
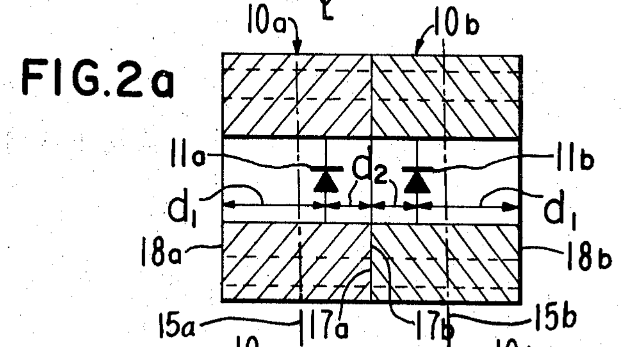
FIGS. 2*a*, 2*b*, and 2*c* show three possible arrangements of two microwave waveguide modules to yield three microwave oscillators operating in three different frequency ranges.
Figure 3:
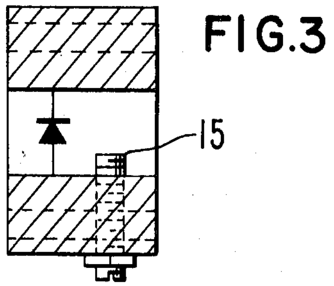
FIG. 3 shows a basic microwave waveguide module with a tuning stub placed therein.
Figure 2B:
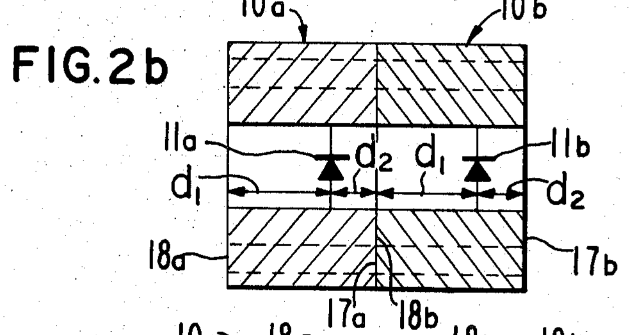
Figure 2C:
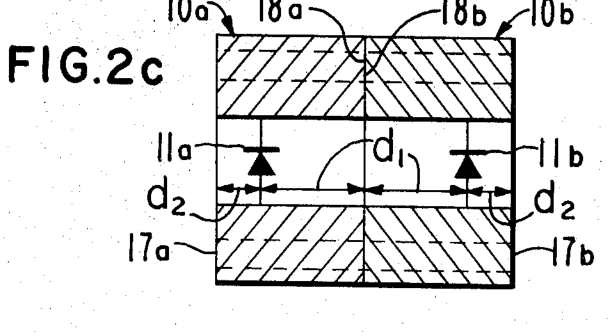

FIGS. 2*a*—2*c* show how three different microwave oscillators operating at three different optimum frequencies can be constructed merely by changing the relative orientation of two modules of the same type. In these FIGS. because the two modules are the same type, (i.e., the housing 16 and cavities 14 of the two modules have the same dimensions, and the solid state devices 11 are located the same distances $d_1$ and $d_2$, from the faces 17 and 18 of the two modules) the modules will be denoted by the number 10 used to designate the same type module in FIGS. 1*a* through 1*c*. However, the letters *a* and *b* following the number 10 will be used to identify each of the two identical modules combined to yield the microwave oscillator. Likewise the faces of each module will be identified by the numbers 17 and 18 followed by the letter designating the particular module whose face is being described. Thus, as shown in FIG. 2*a*, modules 10*a* and 10*b* are joined together such that faces 17 *a* and 17*b* abut. The spacing between solid state devices 11*a* and 11*b* is just $2d_2$. Thus the operating frequency range of this two-device microwave oscillator is determined by this spacing.

To produce from these same two mounts or modules a microwave oscillator with a slightly lower frequency, either module 10*a* or module 10*b* is rotated 180° about its center line 15*a* or 15*b* prior to being placed adjacent the other module. Thus as shown in FIG. 2*b*, module 10*b* has been rotated 180° such that when modules 10*a* and 10*b* are joined together to form a two-module microwave oscillator, face 17*a* of module 10*a* is flush with face 18*b* of module 10*b*. The spacing between solid state devices 11*a* and 11*b* is now $d_2+d_1$. Because $d_1$ is larger than $d_2$, the operating frequency range of this oscillator is lower than the frequency range of the oscillator shown in FIG. 2*a*.

An oscillator operating over a third frequency range, lower than the frequency ranges of the oscillators shown in FIGS. 2*a* and 2*b*, is obtained by rotating module 10*a* 180° about its centerline 15*a* with respect to its position in FIG. 2*b*. Consequently, when modules 10*a* and 10*b* are joined together to form a two-module oscillator, face 18*a* of mount 10*a* is flush with face 18*b* of mount 10*b*. Solid state devices 11*a* and 11*b* are now separated by distance $2d_1$. Thus the operating frequency range of the resulting two-module microwave oscillator is lower than the operating frequency ranges of the oscillators shown in FIGS. 2*a* and 2*b*.

Several modules substantially identical to the module type (hereafter called the "first module type") shown in FIGS. 1*a* through 1*c* were constructed of brass. These modules had a width *w* of 1.6 centimeters, a distance $d_1$ of 0.95 centimeters and a distance $d_2$ of 0.65 centimeters. When two such modules were placed as shown in FIGS. 2*b* and 2*c*, microwave oscillators operating at the frequencies 11.160 and 10.608 GHz were obtained. These frequencies correspond to device spacings of 1.6 and 1.9 centimeters respectively.

Figure 4:
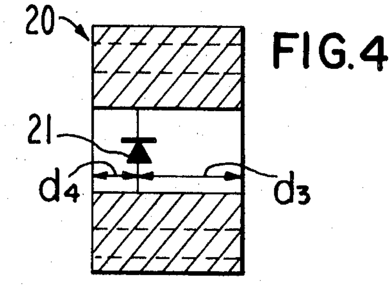
FIG. 4 shows a second waveguide module containing an asymmetrically mounted solid state device.

While with one asymmetrical module type, three different optimized microwave oscillators are obtainable, each containing two solid state devices with two different asymmetrical module types, 10 different microwave oscillators, each containing two solid state devices, are obtainable. Thus, by combining module 10 shown in FIGS. 1*a* through 1*c* with the similar module 20 shown in cross section in FIG. 4, it is apparent that four different spacings between solid state devices 11 and 21 can be obtained. These spacings are $(d_1+d_3)$, $(d_1+d_4)$, $(d_2+d_3)$, and $(d_2+d_4)$. Including the three additional spacings, $2d_1$, $2d_2$, and $(d_1+d_2)$, obtainable by using only two modules identical to module 10 (FIGS. 1*a* through 1*c* ) together with the three similar spacings, $2d_3$, $2d_4$, and $(d_3+d_4)$, obtainable by using only two modules identical to module 20 (FIG. 4) gives a total of 10 device spacings and thus 10 optimum frequency ranges obtainable with just two asymmetrical module types.

Several modules of a second type were constructed of brass, with the following dimensions.

Module Type No. 2

$w$=1.75 cm.

$d_1$=0.95 cm.

$d_2$=0.8 cm.

Four microwave oscillators were constructed using one second type and one first type module. These four oscillators had optimum frequencies of oscillation of 10.608, 10.965, 11.160, and 11.286 GHz, corresponding to device spacings of 1.9, 1.75, 1.6, and 1.45 cm. respectively.

Composite structures containing three or four units can also be built using the modules containing the asymmetrically mounted active solid state devices of this invention. However, the number of alternative spacings between adjacent devices, which spacings must be the same throughout the structure, to achieve both optimum power output and the desired oscillatory signal with low distortion, necessarily drop as the number of tandemly-connected modules containing asymmetrically mounted solid state devices increase. Using two different module types and connecting three of these modules to produce a three-device microwave oscillator, two alternative solid state device spacings are obtained. And these two alternative spacings are obtained under special conditions; that is, when the device in each of the two module types must be a given distance from one of its module's two parallel faces (17 and 18 in FIG. 1*b*) and twice the distance of the device in one module type from that module's other face must equal the width of the other module type. Furthermore, under the same conditions only a single device spacing is possible in a four-device microwave oscillator with only two different asymmetrical module types available.

However, design flexibility can be substantially increased by adding a third type module. A third type module with the following dimensions was constructed.

Module Type No. 3
$w$=1.6 cm.
$d_1$=0.5 cm.
$d_2$=1.1 cm.

With the first, second, and third module types possessing the spacings between the two solid state devices: ($2d_1$), ($2d_2$), ($2d_5$), ($d_1+d_2$), ($d_1+d_5$), and ($d_2+d_5$). Using the above two-module types, three three-module microwave oscillators can be constructed with the following spacings between adjacent solid state devices: ($d_1+d_5$), ($d_2+d_5$) AND ($2d_5$). Significant reductions in the production costs of microwave oscillators and amplifiers are achieved by assembling a number of different microwave power sources from a smaller number of solid state device module types.

Figure 5A:
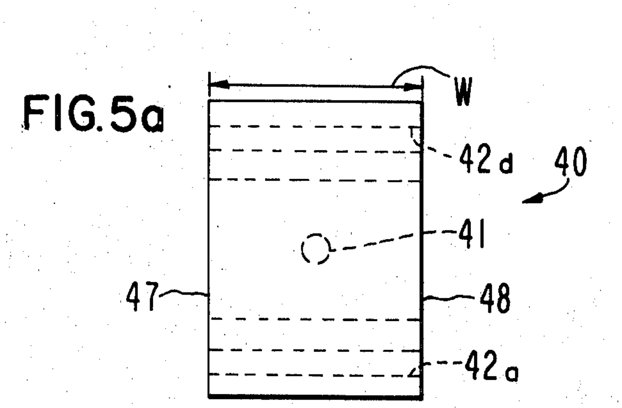
FIGS. 5*a*, 5*b*, and 5*c* show schematically a microwave waveguide module containing a symmetrically mounted active solid state device.
Figure 5B:
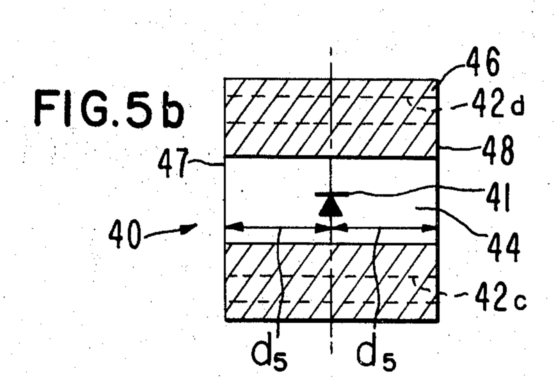
Figure 5C:
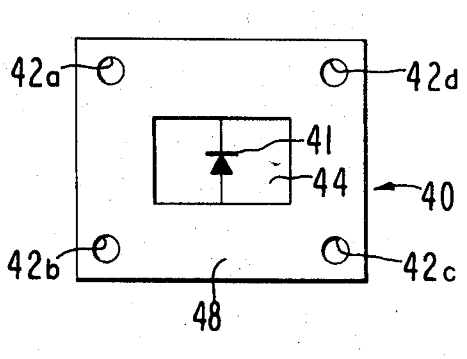

From the above description, clearly a wide variety of oscillator frequency ranges can be obtained by combining in various ways, a certain basic number of solid state device modules. Table I shows the various solid state device spacings obtainable in a two-module microwave power source by combining, in various ways, modules selected from several module types. The module types are defined by their widths $w_i$, where the integer subscript $i$ indicates the type. Width $w_i$, in turn, equals the sum of the distances of the active solid state device from the two faces 17 and 18 (FIGS. 1*a*, 1*b* and 1*c*) or 47 and 48 (FIGS. 5*a*, 5*b* and 5*c*).

TABLE I

Number of two-module microwave oscillators which can be constructed from various module types:

| | $w_3=2d_5$ | $w_4=d_3+d_4$ |
|---|---|---|
| $w_1=d_1+d_2$ | ($2d_1$),($2d_2$,($2d_5$),($d_1+d_2$),($d_1+d_5$),($d_2+d_5$) | ($2d_1$),($2d_2$),($2d_3$),($2d_4$),($d_1+d_2$),($d_1+d_3$),($d_1+d_4$),($d_2+d_3$),($d_2+d_4$),($d_3+d_4$). |
| $w_2=2d_6$ | ($2d_5$),($2d_6$),($d_5+d_6$) | Same combinations as $w_1$ and $w_3$. |

above dimensions, four alternative solid state device spacings are possible in a three-device microwave oscillator. Furthermore, up to three alternative device spacings are possible in a four-module structure.

While so far, modules containing asymmetrically mounted solid state devices have been described, this invention also includes modules containing symmetrically mounted solid state devices. FIGS. 5*a*, 5*b* and 5*c* show such a module 40. In this module, solid state device 41 is symmetrically mounted in cavity 44 between faces 47 and 48 of housing 46. The centerline of device 41 is aligned along the center line of module 40. The width $w$ of module 40 can vary from module type to module type. But in each module type, device 41 will be symmetrically mounted in cavity 44.

Figure 6A:
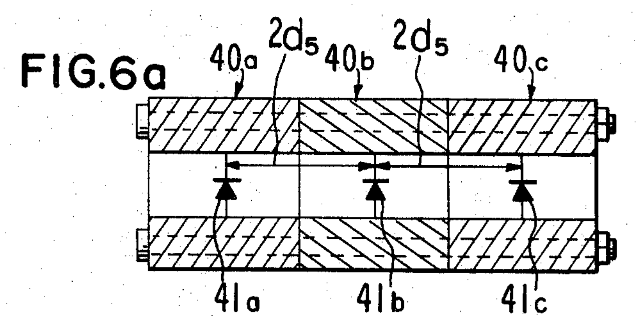
FIGS. 6*a*, 6*b*, and 6*c* are cross-sectional schematic views of a microwave power source constructed from modules containing symmetrically and asymmetrically mounted solid state devices.
Figure 6B:
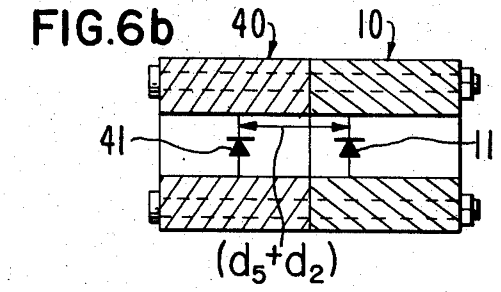

A plurality of modules, each containing a symmetrically mounted, active, solid state device 41, are aligned and bolted together by running bolts through holes 42*a*, 42*b*, 42*c*, and 42*d*. The number of modules joined to form a microwave waveguide power source depends, of course, on the amount of power desired. FIG. 6*a* shows three solid state device modules 40*a*, 40*b* and 40*c* of the type 40 shown in FIGS. 5*a* through 5*c*, connected in tandem to form a three-device microwave oscillator. The spacing between adjacent solid state devices 41 is just $2d_5$. FIG. 6*b* shows a two-module microwave oscillator constructed by combining a module 40, of the type shown in FIG. 5*a*, with a module 10 of the type shown in FIG. 10*a*. Solid state devices 41 and 11 are separated by the distance ($d_5+d_2$). By merely rotating module 10 180° about its centerline, the spacing between devices 41 and 11 can be changed to ($d_5+d_1$).

Figure 6C:
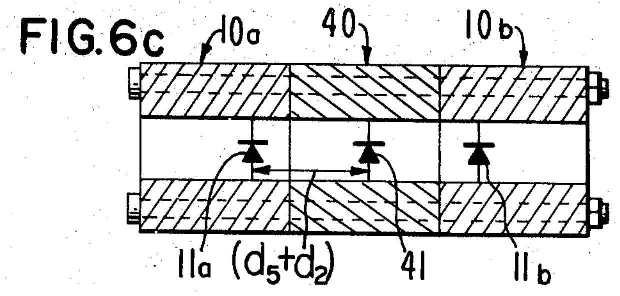

It will be apparent that various combinations of the described solid state device modules will yield multimodule oscillators operable over a variety of frequency ranges. For example, by adding another solid state device module of the type shown in FIGS. 1*a* through 1*c*, to the structure shown in FIG. 6*b*, the structure shown in FIG. 6*c* is obtained. In this structure each of the solid state devices 41 or 11 is separated by the spacing ($d_5+d_2$). Clearly by rotating each outside module 10*a* and 10*b* by 180°, the spacing between adjacent semiconductor devices can be changed to ($d_5+d_1$). Thus, with just two module types, one module type containing a symmetrically mounted solid state device, and the other module type containing an asymmetrically mounted solid state device, two-module microwave oscillators can be constructed with the following In essence, for a given cavity width and height, these distances completely describe the module type. Table I shows that 10 different two-module microwave power sources can be obtained from just two module types when the two types each contain an asymmetrically mounted solid state device. When only one module type contains an asymmetrically mounted device and the other module type contains a symmetrically mounted device, six different two-module microwave power sources are obtained. And when both module types contain symmetrically mounted solid state devices, three different two-module microwave power sources are obtained.

Figure 7:
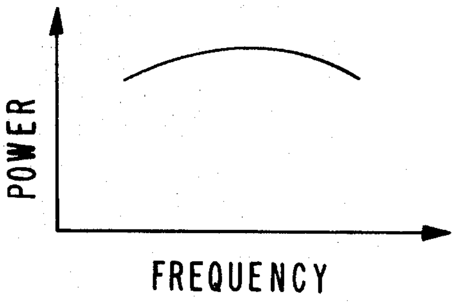
FIG. 7 is a qualitative plot of power versus frequency for a typical multidevice microwave power source.

A microwave oscillator with a given solid state device spacing will produce maximum output power at a frequency possessing a waveguide wavelength twice the device spacing. However, this frequency can be varied by adjusting the position of a shorting bar or "plunger," (not shown in any FIG.), at one end of the waveguide. By moving this plunger toward or away from the nearest solid state device, the operating frequency of the oscillator is increased or decreased, respectively. Of course, the power output drops from the maximum power output, as shown in FIG. 7, for any movement of the shorting plunger in either direction from its optimum position. But a significant range of oscillating frequencies is obtained for one device spacing before the output power drops one (1) db.

Other combinations of microwave waveguide modules containing symmetrically or asymmetrically mounted solid state devices will be obvious in view of this disclosure. In particular, any waveguide including striplines, microstrips or other microwave transmission lines which guide electrical and magnetic signals, can be constructed from modules similar to those disclosed herein.

It should also be noted that the drawings omit, for simplicity, two additional but standard parts necessary to make the structures shown in the drawings resonate and produce output power: a short circuit of conductive material, fixed or adjustable for tuning purposes, which must be provided at one end of each structure shown, and an output coupling device at the other end of each structure shown, which can be any appropriate impedance matching element, fixed or adjustable, such as the well-known three screw tuner.

I claim:

1. Microwave power source comprising:

a first and a second tandemly-connected module, said first and second module each comprising a housing containing at least two parallel opposite faces, a microwave waveguide cavity within said housing opening on each of said two parallel opposite faces; and an active solid state device selectively placed within said cavity, such that its longitudinal axis is parallel to said two parallel faces, the solid state device in said first module being symmetrically placed equidistant from each of said two parallel faces, while the solid state device in said second module is asymmetrically placed relative to said two parallel faces; and means for aligning and joining said first and second second modules such that the cavities in each of said modules are aligned to form a microwave waveguide.

2. A microwave power source comprising:

a plurality of tandemly-connected modules, each module comprising:

a housing possessing at least a first set of two parallel faces, with a microwave cavity extending from one to the other face; and an active solid state device selectively mounted in said cavity with the longitudinal axis of said solid state device parallel to said two parallel faces;

the solid state device in each of a selected number of said plurality of tandemly-connected modules being symmetrically mounted with respect to the first set of two parallel faces of each of said selected number of modules, while the solid state device in each of the remainder of said plurality of tandemly-connected modules is asymmetrically mounted with respect to the first set of two parallel faces of each of said remaining modules.

3. Structure as in claim 2 in which said housing possesses in addition to said first set of two parallel faces, a second set of two parallel faces and a third set of two parallel faces, said first, second, and third sets of parallel faces being mutually perpendicular, and said cavity contains two sets of mutually perpendicular pairs of walls, parallel to said second and said third sets of parallel faces respectively, said cavity having openings in each of the faces in said first set of parallel faces.

4. Structure as in claim 3 in which the longitudinal axis of said solid state device is parallel to both the first set of parallel faces, and the second set of parallel faces, said longitudinal axis being perpendicular to said third set of parallel faces.

5. Structure as in claim 2 in which said solid state device is a diode.

6. Structure as in claim 2 in which said solid state device is a device which directly converts DC power to RF power at microwave frequencies.

7. Structure as in claim 2 in which each module housing contains means for aligning and joining said module to similar microwave modules.

8. Structure as in claim 7 wherein said means for aligning comprise four holes in said housing perpendicular to said first set of two parallel faces.

9. Structure as in claim 2 wherein said microwave power source comprises a microwave oscillator.

10. Structure as in claim 2 wherein said microwave power source comprises a microwave amplifier.

11. A microwave power source comprising:

a plurality of tandemly-connected modules, each module comprising:

a housing possessing at least a first set of two parallel faces, with a microwave cavity extending from one to the other face; and an active solid state device selectively mounted in said cavity with the longitudinal axis of said solid state device parallel to said two parallel faces;

the solid state device in each of said plurality of tandemly-connected modules being asymmetrically mounted with respect to the first set of two parallel faces so as to allow the spacings between the solid state devices in adjacent modules to be controlled by controlling the way in which said tandemly-connected modules are oriented with respect to each other.